United States Patent
Scharf et al.

(10) Patent No.: US 10,131,219 B2
(45) Date of Patent: Nov. 20, 2018

(54) SUSPENSION LINK ELEMENT

(71) Applicants: BOGE ELASTMETALL GMBH, Damme (DE); VOLKSWAGEN AKTIENGESELLSCHAFT, Wolfsburg (DE)

(72) Inventors: Joerg Scharf, Eppenrod (DE); Henning Peiser, Braunschweig (DE); Karsten Wurm, Wolfsburg (DE)

(73) Assignee: BOGE ELASTMETALL GMBH, Damme (DE)

( * ) Notice: Subject to any disclaimer, the term of this patent is extended or adjusted under 35 U.S.C. 154(b) by 66 days.

(21) Appl. No.: 15/302,109

(22) PCT Filed: Apr. 9, 2015

(86) PCT No.: PCT/EP2015/057791
§ 371 (c)(1),
(2) Date: Oct. 5, 2016

(87) PCT Pub. No.: WO2015/155319
PCT Pub. Date: Oct. 15, 2015

(65) Prior Publication Data
US 2017/0182875 A1    Jun. 29, 2017

(30) Foreign Application Priority Data
Apr. 11, 2014   (DE) .................. 10 2014 207 011

(51) Int. Cl.
*B60K 5/12* (2006.01)
*B60G 7/00* (2006.01)
*F16F 1/38* (2006.01)

(52) U.S. Cl.
CPC ............ *B60K 5/1241* (2013.01); *B60G 7/001* (2013.01); *B60K 5/1266* (2013.01);
(Continued)

(58) Field of Classification Search
CPC .... B60K 5/1241; B60K 5/1266; B60G 7/001; B60G 2204/422; B60G 2204/12; B60G 2204/10; F16F 1/3849
See application file for complete search history.

(56) References Cited

U.S. PATENT DOCUMENTS 9,476,479 B2 * 10/2016 Nakamura ............ F16F 1/3842
9,815,361 B2 * 11/2017 Patel .................... B60K 5/1241
(Continued)

FOREIGN PATENT DOCUMENTS

DE          196 31 893 C2    2/1998
DE    10 2009 027 735 A1    1/2011
(Continued)

OTHER PUBLICATIONS

German Search Report in counterpart German Application No. DE 10 2014 207 011.2 dated Apr. 6, 2015 (10 pages).
(Continued)

*Primary Examiner* — Drew J Brown
(74) *Attorney, Agent, or Firm* — Cohen & Hildebrand, PLLC

(57) ABSTRACT

The invention relates to a link element (1) for a motor vehicle, comprising a connecting rod (2) and a coupling element (3) for coupling the connecting rod (2) to a subassembly of the motor vehicle, wherein the coupling element (3) comprises a housing (5) with a passage (6) through which the connecting rod (2) extends into the housing (5); characterized by a stop plate (7) for supporting forces transferred to the coupling element (3) by the connecting rod (2).

16 Claims, 4 Drawing Sheets

(52) U.S. Cl.
CPC ........ *F16F 1/3849* (2013.01); *B60G 2204/10* (2013.01); *B60G 2204/12* (2013.01); *B60G 2204/422* (2013.01); *B60G 2206/11* (2013.01)

(56) References Cited

U.S. PATENT DOCUMENTS

| | | | |
|---|---|---|---|
| 2015/0008305 A1* | 1/2015 | Loeffelsender ...... | B60K 5/1241 248/638 |
| 2015/0129742 A1* | 5/2015 | Okanaka .............. | B60K 5/1208 248/634 |
| 2015/0204414 A1* | 7/2015 | Yun ....................... | F16F 1/3849 248/635 |
| 2015/0240908 A1* | 8/2015 | Pizanti .................. | F16M 13/02 248/634 |

FOREIGN PATENT DOCUMENTS

| | | |
|---|---|---|
| DE | 202013102964 U1 | 7/2013 |
| DE | 102012017319 A1 | 10/2013 |
| DE | 102009028458 A1 | 2/2015 |
| EP | 0 849 491 A2 | 6/1998 |
| EP | 1387108 A2 | 2/2004 |

OTHER PUBLICATIONS

International Search Report of PCT/EP2015/057791, dated Aug. 20, 2015.

\* cited by examiner

SUSPENSION LINK ELEMENT

This is an application filed under 35 USC § 371 of PCT/EP2015/057791, filed on Apr. 9, 2015 claiming priority to DE 10 2014 207 011.2, filed on Apr. 11, 2014, each of which is herein incorporated by reference in its entirety.

BACKGROUND OF THE INVENTION

The invention is directed to a link element for a motor vehicle according to the preamble of claim 1.

Generic link elements are used for power transmission, between two subassemblies and include connecting rods to transmit forces and/or movements between adjacent subassemblies, e.g. between various subassemblies in the chassis of a motor vehicle that can move relative to one another. Potential applications include, for example, connecting rods for supporting drive assemblies (e.g. engine/transmission) in motor vehicles relative to the chassis or body, connecting rods for articulating springs, dampers and/or stabilizers of vehicle axles or independent wheel suspensions, or generally connecting rods for coupling a body component with a chassis component.

Such link element is known from DE 10 2009 028 458 A1.

The connecting rod of such link element is coupled to the adjacent subassemblies by way of coupling elements. Such coupling element may be, for example, a round bearing, in which the connecting rod is radially inserted. A disadvantage of known designs is that the stops in the pulling or pivoting direction are relatively small, which may adversely affect the comfort, especially the acoustics, and/or the service life. Furthermore, the relatively small stop faces produce a relatively high surface pressure in this area.

BRIEF SUMMARY OF THE INVENTION

The object is therefore to provide a link element of the aforementioned type, which overcomes or at least ameliorates these drawbacks.

This object is achieved by the invention recited in claim 1. Advantageous embodiments are recited in the dependent claims.

According to the invention, a link element for a motor vehicle is provided, which includes a connecting rod and a coupling element for coupling the connecting rod to a subassembly of the motor vehicle, wherein the coupling element has a housing with a passage through which the connecting rod extends into the interior of the housing, characterized by a stop plate to support forces transferred to the coupling element by the connecting rod.

The stop plate is a component that can take the form of a shield, and which serves to dampen and limit pivoting movement of the connecting rod relative to the coupling element.

The present invention is based on the realization that the size of the available stop surface can be significantly increased by an additional component, namely the stop plate. The enlarged stop surface reduces the surface pressure. Furthermore, movements of the connecting rod leading to the stop can be better dampened. The two above-mentioned measures increase the comfort and service life of the link member and of the subassemblies coupled thereto.

In one embodiment of the invention, the stop plate is arranged at the connecting rod, thus allowing the stop plate to participate in movements of the connecting rod.

In one embodiment, the stop plate is disposed within the housing, wherein the stop plate cooperates with at least one counter-stop within the housing for supporting pivoting movements of the connecting rod with respect to the coupling element. In this embodiment, the stop plate does not require additional installation space and can thus be made more compact.

In one embodiment, the stop plate has an opening capable of accommodating the connecting rod, in particular form-fittingly. This embodiment allows a simple installation of the stop plate. In particular, the stop plate can be placed onto the connecting rod in a simple manner. The connecting rod can then be connected with the coupling element in a conventional manner.

In one embodiment, the coupling element is formed by a cylindrical round bearing, wherein the stop plate is in the shape of a cylinder wall portion. The stop plate thus matches the shape of the round bearing, which allows a compact design.

In one embodiment, the stop plate has a larger circumference or a larger area than the passage in the housing, through which the connecting rod extends into the interior of the housing of the coupling element. The stop plate may here be arranged in the region of the passage. In this embodiment, the stop plate forms a cover for the passage. By covering the passage, contamination in the interior of the coupling element can be reduced.

To prevent objectionable impact noises, the stop plate may advantageously abut the inside of the housing.

In one embodiment, the stop plate is made of sheet steel, for example spring sheet steel, of aluminum or of organic sheet. Organic sheet is characterized by a low weight while still exhibiting durability. Organic sheet is here to be understood as a fiber-reinforced plastic (FRP) material in the form of a continuous-fiber-reinforced thermoplastic or thermosetting plastic. Reinforcing fibers made of fiberglass, carbon fiber or aramid fiber or Kevlar, particularly in the form of continuous fibers, are used to handle the force. To ensure the fiber orientation and the dimensional stability, the aforementioned reinforcing fibers are embedded in a thermoplastic matrix material (e.g. polyamide, PA). The fibers embedded in the matrix material can be oriented in a single direction or arranged at any angle relative to each other in form of a woven fabric or a scrim.

An embodiment of the invention will now be described in more detail with reference to the drawing, which shows in a schematic diagram in:

DETAILED DESCRIPTION OF THE INVENTION

Figure 1:
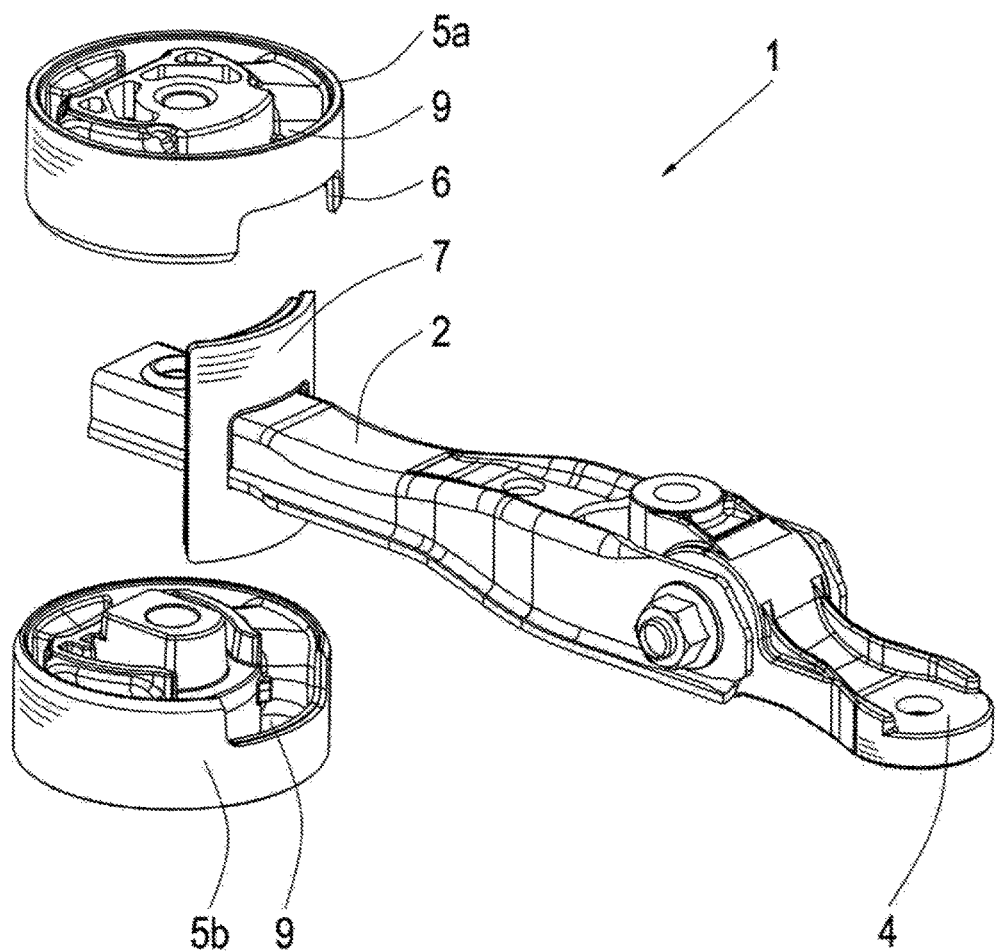
FIG. 1 a perspective view of various parts of a link element according to one embodiment of the invention.

FIG. 1 shows a link element 1 for a motor vehicle according to one embodiment of the present invention. The link element 1 includes a connecting rod 2, which can be coupled at one end with a first coupling element 3 and which is already coupled at the other end with a second coupling element 4.

Figure 2:
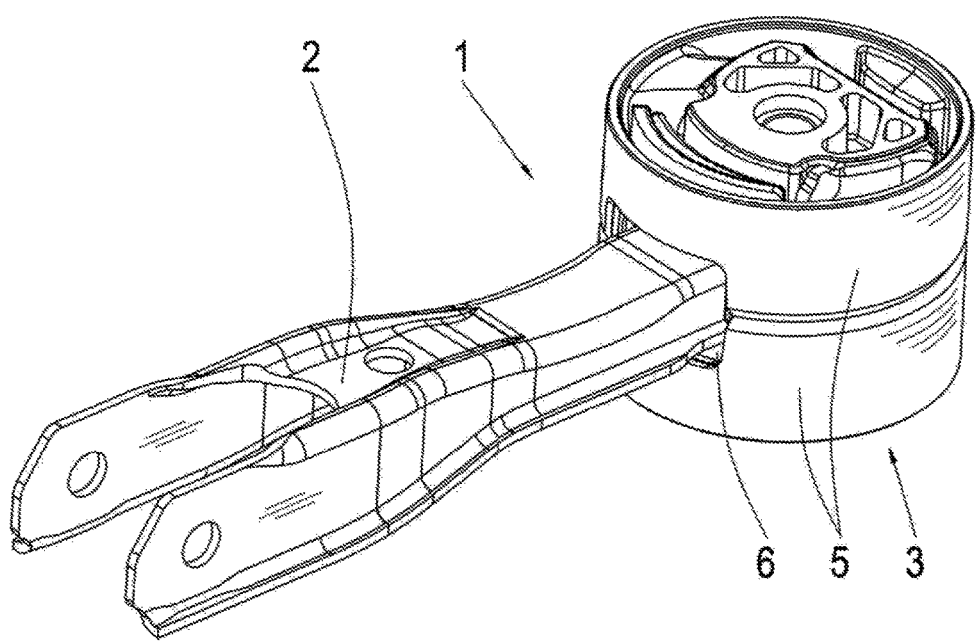
FIG. 2 a perspective view of parts of the link element of FIG. 1 in an assembled state.
Figure 3A:
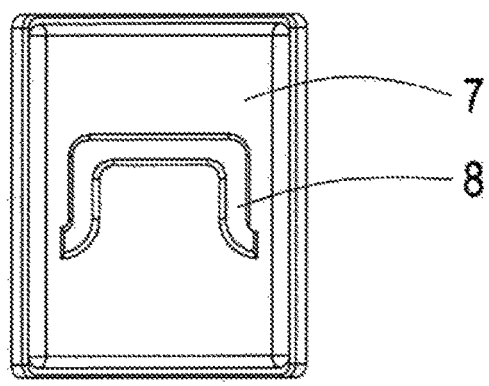
FIGS. 3*a*-3*d* a stop plate for the link element of FIG. 1 from different perspectives.
Figure 3B:
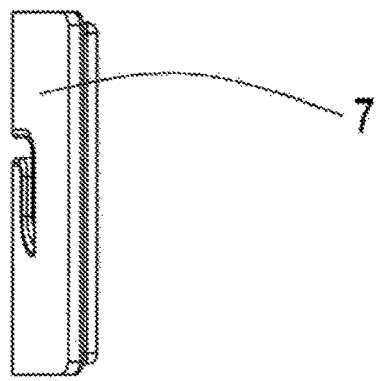
Figure 3C:
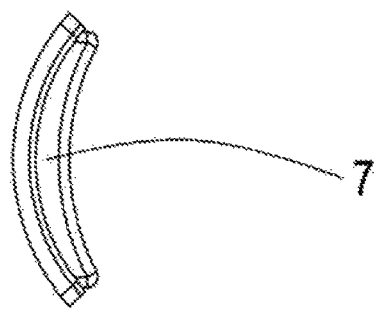
Figure 3D:
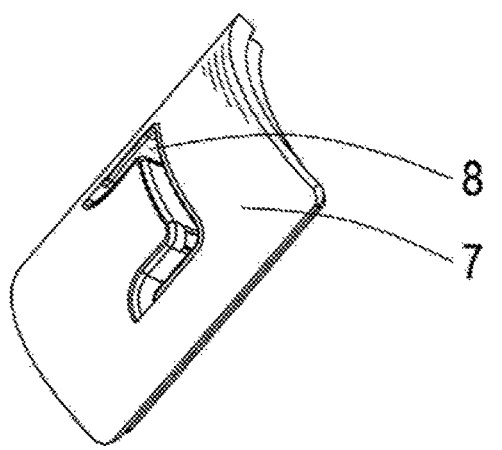
Figure 4A:
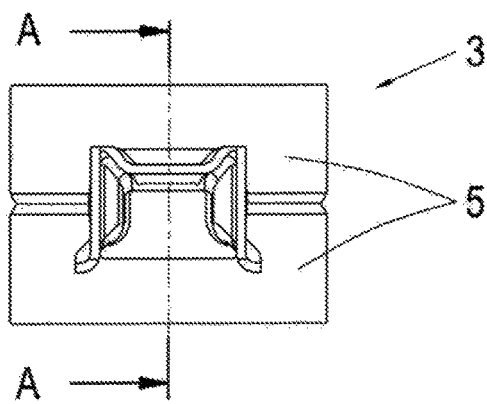
FIG. 4*a* a side view of the link element of FIG. 1.
Figure 4B:
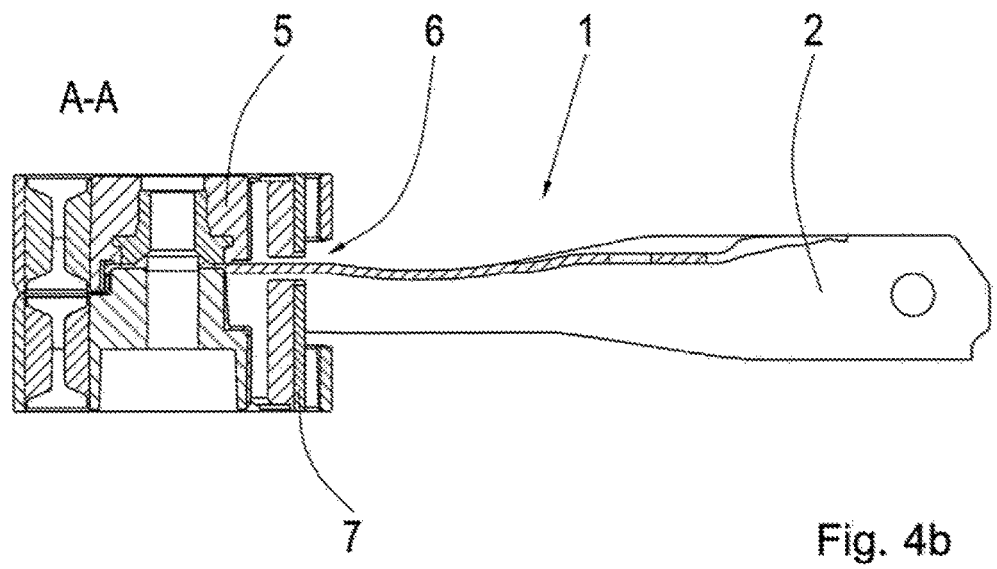
FIG. 4*b* a cross section through the link element along the line A-A in FIG. 4*a*.

As shown in FIGS. 1 and 2, the first coupling element 3 includes a housing 5, which is constructed from an upper section 5a and a lower section 5b. In the FIGS. 2, 4a and 4b, the two sections 5a and 5b are connected to each other. In this configuration, the connecting rod 2 extends through a passage 6 into the interior of the housing 5 and is movably connected therein with the coupling element 3. The movable connection may include a pivoting movement, a linear movement, a rotational movement or a combination of the aforementioned types of movements.

The coupling elements 3 and 4 may in turn be connected to respective subassemblies of a motor vehicle.

A stop plate 7, which serves to support movements of the connecting rod relative to the housing 5 of the coupling element 3, is provided at the connecting rod 2. FIGS. 3a-3d show the stop plate from different perspectives. The stop plate 7 has an opening 8 for positively accommodating the connecting rod 2. Accordingly, the opening 8 has an outline corresponding to the cross section of the connecting rod 2 plus a mounting and decoupling gap. In the illustrated embodiment, the opening 8 is substantially U-shaped.

In the assembled state of the link element 1 illustrated in FIGS. 1 and 5, the stop plate 7 is arranged inside the housing. The pivoting movement of the stop plate 7 is limited by counter-stops 9 inside the housing 5. The counter stops 9 can be formed, for example, by walls extending radially with respect to the center of the housing 5.

The stop shield 7 has the shape of a cylindrical wall section, wherein the radius corresponds substantially to the radius of the outer wall of the cylindrical housing 5. When assembled, the stop plate 7 is arranged in the region of the passage 6. The stop plate 7 partially or completely covers the passage 6 and is thus able to cover the interior of the housing 5 with respect to the outside.

The stop plate 7 may be made of sheet steel, in particular spring sheet steel, or of organic sheet.

REFERENCE SYMBOLS

1 Link element
2 Connecting rod
3 Coupling element
4 Coupling element
5 Housing
5a Upper housing section
5b Lower housing section
6 Passage
7 Stop plate
8 Opening
9 Counter stop

The invention claimed is:

1. A link element (1) for a motor vehicle, comprising a connecting rod (2) and a coupling element (3) for coupling the connecting rod (2) to a subassembly of the motor vehicle, wherein the coupling element (3) comprises a housing (5) with a passage (6), through which the connecting rod (2) extends into the interior of the housing (5), comprising a stop plate (7) for supporting forces transferred to the coupling element (3) by the connecting rod (2); and wherein the stop plate (7) is made of sheet steel, of aluminum or of organic sheet.

2. The link element (1) according to claim 1, wherein the stop plate (7) is arranged on the connecting rod (2).

3. The link element (1) according to claim 1, wherein the stop plate (7) is arranged inside the housing (5) and cooperates with at least one counter stop (9) inside the housing (5) for supporting pivoting movements of the connecting rod (2) relative to the coupling element (3).

4. The link element (1) according to claim 1, wherein the stop plate (7) has an opening (8) configured to accommodate the connecting rod (2).

5. The link element (1) according to claim 4, wherein the connecting rod (2) is positively accommodated in the opening (8).

6. The link element (1) according to claim 5, wherein the stop plate (7) is arranged at the connecting rod (2), thus allowing the stop plate (7) to participate in movements of the connecting rod (2).

7. The link element (1) according to claim 1, wherein the coupling element (3) is formed by a cylindrical round bearing and the stop plate (7) has the shape of a cylinder wall portion.

8. The link element (1) according to claim 1, wherein the stop plate (7) has a larger circumference or a larger area than the passage (6) in the housing (5).

9. The link element (1) according to claim 8, wherein the stop plate (7) forms a cover for the passage (6).

10. The link element (1) according to claim 1, wherein the stop plate (7) is arranged in the region of the passage (6).

11. The link element (1) according to claim 1, wherein the stop plate (7) abuts the inside of the housing (5).

12. The link element (1) according to claim 1, wherein the stop plate (7) is made of spring sheet steel.

13. The link element (1) according to claim 1, wherein the stop plate (7) has a substantially U-shaped opening (8) for receiving the connecting rod (2), wherein the opening (8) has an outline corresponding to a cross section of the connecting rod (2).

14. A link element (1) for a motor vehicle, comprising a connecting rod (2) and a coupling element (3) for coupling the connecting rod (2) to a subassembly of the motor vehicle, wherein the coupling element (3) comprises a housing (5) with a passage (6), through which the connecting rod (2) extends into the interior of the housing (5), comprising a stop plate (7) for supporting forces transferred to the coupling element (3) by the connecting rod (2); wherein the stop plate (7) has a larger circumference or a larger area than the passage (6) in the housing (5); and wherein the stop plate (7) forms a cover for the passage (6).

15. The link element (1) according to claim 14, wherein the stop plate (7) is arranged in the region of the passage (6).

16. The link element (1) according to claim 15, wherein the stop plate (7) abuts the inside of the housing (5).

* * * * *